(12) United States Patent
Stevens

(10) Patent No.: US 12,460,835 B2
(45) Date of Patent: Nov. 4, 2025

(54) LOW CARBON CLIMATE CONTROL APPARATUS

(71) Applicant: Alternative Sustainability IP LLC, Fleming Island, FL (US)

(72) Inventor: John A. Stevens, New York, NY (US)

(73) Assignee: Alternative Sustainability IP LLC, Fleming Island, FL (US)

( * ) Notice: Subject to any disclaimer, the term of this patent is extended or adjusted under 35 U.S.C. 154(b) by 428 days.

(21) Appl. No.: 17/929,494

(22) Filed: Sep. 2, 2022

(65) Prior Publication Data

US 2023/0078650 A1  Mar. 16, 2023

Related U.S. Application Data

(60) Provisional application No. 63/260,866, filed on Sep. 2, 2021.

(51) Int. Cl.
| | |
|---|---|
| *F24F 11/62* | (2018.01) |
| *F24F 8/22* | (2021.01) |
| *F24F 110/12* | (2018.01) |
| *H05B 3/14* | (2006.01) |

(52) U.S. Cl.
CPC .............. *F24F 11/62* (2018.01); *F24F 8/22* (2021.01); *F24F 2110/12* (2018.01); *H05B 3/14* (2013.01); *H05B 2203/02* (2013.01)

(58) Field of Classification Search
CPC ........... F24F 11/62; F24F 8/22; F24F 2110/12
See application file for complete search history.

(56) References Cited

U.S. PATENT DOCUMENTS

| | | |
|---|---|---|
| 5,512,788 A | 4/1996 | Berenda et al. |
| 6,097,104 A | 8/2000 | Russell |
| 6,365,985 B1 | 4/2002 | Cohen |
| 7,112,893 B1 | 9/2006 | Villanueva |
| 8,939,724 B2 | 1/2015 | Koya et al. |
| 8,963,359 B2 | 2/2015 | Evans et al. |
| 9,562,517 B1 | 2/2017 | Decady |
| 10,670,297 B2 | 6/2020 | McMahon |
| 2008/0188174 A1 | 8/2008 | Aminpour et al. |
| 2010/0117370 A1 | 5/2010 | Phelps |
| 2011/0215579 A1 | 9/2011 | Barzilai et al. |
| 2012/0280503 A1 | 11/2012 | Mahawili |
| 2014/0183871 A1 | 7/2014 | Baptiste |

FOREIGN PATENT DOCUMENTS

| | | |
|---|---|---|
| DE | 29521926 U1 | 9/1998 |
| JP | 2008002322 A | 1/2008 |
| KR | 101765703 B1 | 8/2017 |
| WO | 2011058396 A1 | 5/2011 |

*Primary Examiner* — Nael N Babaa
(74) *Attorney, Agent, or Firm* — Offit Kurman, P.A.; Gregory A. Grissett

(57) ABSTRACT

A climate control apparatus is disclosed. The climate control apparatus of the present invention switches between types of heat depending on the ambient temperature of an outdoor space. The climate control apparatus includes an exterior housing, an electric heating coil, a steam heating coil, a temperature sensor, a controller, and a heating switch to heat an indoor space more efficiently than existing climate control apparatuses.

14 Claims, 2 Drawing Sheets

LOW CARBON CLIMATE CONTROL APPARATUS

CLAIM OF PRIORITY

This application claims priority to U.S. Provisional Patent Application No. 63/260,866, filed Sep. 2, 2021, entitled "Low Carbon Climate Control Apparatus", the contents of which are hereby incorporated by reference in their entirety.

NOTICE OF COPYRIGHTS AND TRADE DRESS

A portion of the disclosure of this patent document contains material which is subject to copyright or trade dress protection. This patent document may show and/or describe matter that is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

FIELD OF THE EMBODIMENTS

The present disclosure relates generally to a climate control apparatus. More particularly, the present disclosure relates to a climate control apparatus that combines a highly efficient electric heating coil with a steam heating coil, a temperature sensor, and a controller configured to switch between the electric heating coil and the steam heating coil, in order to provide a lower carbon footprint solution for climate control in the interior of a building.

BACKGROUND

In order to satisfy the heating needs of occupants, steam is commonly circulated inside buildings, particularly large buildings, as a method of heating the interiors of such buildings. The circulated steam is typically run through a steam heating coil or radiator, in order to distribute the heat energy in the steam into the surrounding air. In many cases, such steam heating coils are also packaged with an air conditioning unit into a single climate control apparatus commonly called a Package Terminal Air Conditioner, or PTAC.

However, there are a number of major issues with steam heating. Firstly, steam heating is fairly expensive. This can be because of aging infrastructure and other inefficiencies associated with centralized steam producers, such as Con Edison in New York. Secondly, steam heating involves the release of greenhouse gases, through the burning of fuels such as gas or coal, and is therefore not "green".

Therefore, there is demand for a heating solution for buildings that utilizes less steam. Such a heating solution must also be both cheap and lower in carbon emissions. Further, if a product can lower the amount of gas or coal used in heating a building (by using less steam), the product will also lower the carbon footprint of such a building, raise the energy score associated with the building, save a substantial amount of money in gas or coal purchases, and avoid any local penalties for having a high carbon footprint. In combination with the trend amongst companies and municipalities in working to reduce the usage of natural gas, there is more demand for technologies that can reduce the usage of natural gas than ever. Thus, such a product is currently highly desirable.

SUMMARY OF THE INVENTION

The present disclosure provides for a climate control apparatus including an exterior housing preferably having a plurality of walls, with an interior surface and an exterior surface. In some embodiments, the climate control apparatus includes one or more of an electric heating coil, a steam heating coil, a temperature sensor configured to detect an ambient temperature of an outdoor space, a controller, and a heating switch in electronic communication with the controller and having an active position and an inactive position. Preferably, the controller is in electronic communication with the electric heating coil, the steam heating coil, and the temperature sensor. In some embodiments, the controller is configured to activate the electric heating coil when the heating switch is in the active position and when the temperature sensor detects that the ambient temperature of the outdoor space is above a threshold temperature. In some embodiments, the controller is configured to activate the steam heating coil when the heating switch is in the active position and when the temperature sensor detects that the ambient temperature of the outdoor space is below a threshold temperature.

In some embodiments, the climate control apparatus includes a cooling system. Preferably, the cooling system includes one or more of an air filter, a supply fan, a condensate pan, an evaporator coil, a condenser coil, a condenser fan, and a compressor.

In some embodiments, the threshold temperature is between 25-40° F., preferably the threshold temperature is between 30-35° F., more preferably the threshold temperature is 32° F.

In some embodiments, the threshold temperature is adjustable, preferably the threshold temperature is automatically adjustable or manually adjustable.

In some embodiments, the controller is configured to deactivate the electric heating coil when the temperature sensor detects that the ambient temperature of the outdoor space is below the threshold temperature or the heating switch is in the inactive position, and preferably the controller is configured to deactivate the steam heating coil when the temperature sensor detects that the ambient temperature of the outdoor space is above a threshold temperature or the heating switch is in the inactive position.

In some embodiments, the electric heating coil is at least partially made of carbon, a material comprising carbon, or a carbon-based material. In some embodiments, the electric heating coil is at least partially made of ceramic, a material comprising ceramic, or a ceramic-based material.

In preferred embodiments, the electric heating coil is a positive temperature coefficient heating element.

In some embodiments, the climate control apparatus includes a sterilization system, preferably a UV-C light-based sterilization system.

The present disclosure also provides for a climate control apparatus including an exterior housing, preferably having a plurality of walls, with an interior surface and an exterior surface. In some embodiments the climate control apparatus includes one or more of a ceramic positive temperature coefficient electric heating coil, a steam heating coil, a temperature sensor configured to detect an ambient temperature of an outdoor space, a controller in electronic communication with the electric heating coil, the steam heating coil, and the temperature sensor, a heating switch in electronic communication with the controller and having an active position and an inactive position, a UV-C light-based sterilization system, a cooling system. Preferably, the controller is configured to activate the electric heating coil when the heating switch is in the active position and when the temperature sensor detects that the ambient temperature of the outdoor space is above a threshold temperature, and the controller is configured to activate the steam heating coil when the heating switch is in the active position and when the temperature sensor detects that the ambient temperature of the outdoor space is below a threshold temperature.

In some embodiments, the threshold temperature is between 25-40° F., preferably between 30-35° F., more preferably the threshold temperature is 32° F.

In some embodiments, the controller is configured to deactivate the electric heating coil when the temperature sensor detects that the ambient temperature of the outdoor space is below the threshold temperature or the heating switch is in the inactive position, and the controller is configured to deactivate the steam heating coil when the temperature sensor detects that the ambient temperature of the outdoor space is above a threshold temperature or the heating switch is in the inactive position.

In some embodiments, the threshold temperature is automatically adjustable or manually adjustable.

The claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

Implementations may include one or a combination of any two or more of the aforementioned features or embodiments.

These and other aspects, features, implementations, and advantages can be expressed as methods, apparatuses, systems, components, program products, business methods, and means or steps for performing functions, or some combination thereof.

Other features, aspects, implementations, and advantages will become apparent from the descriptions, the drawings, and the claims.

BRIEF DESCRIPTION OF THE PREFERRED EMBODIMENTS

In the drawings, like elements are depicted by like reference numerals. The drawings are briefly described as follows.

Figure 1:
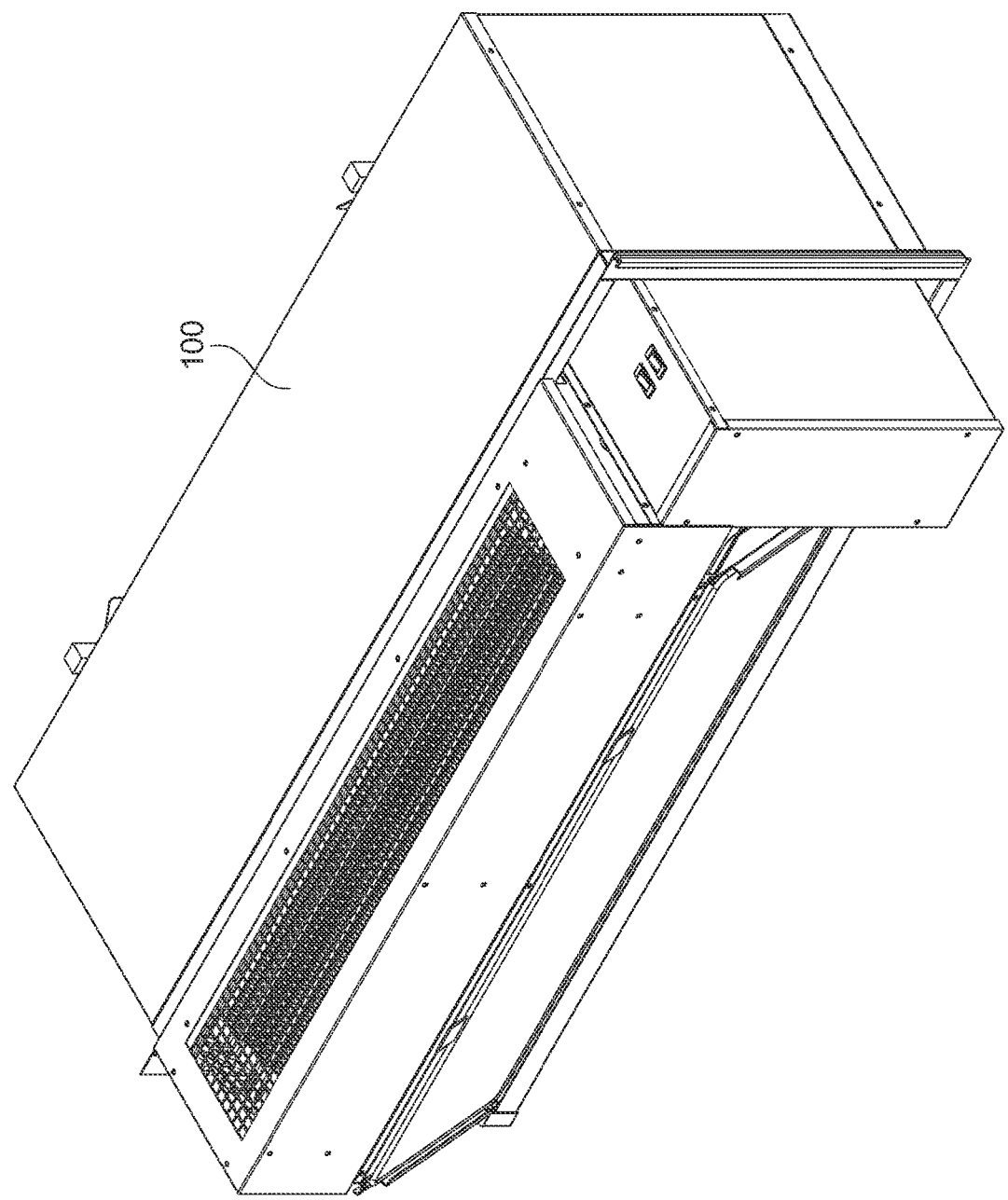
FIG. 1 is a top perspective view, showing an example embodiment of the climate control apparatus according to the present disclosure.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete, and fully conveys the scope of the present disclosure to those skilled in the art. In fact, it will be apparent to those skilled in the art that various modifications and variations can be made in the present invention without departing from the scope or spirit of the invention.

DETAILED DESCRIPTION OF THE PREFERRED EMBODIMENTS

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto in any manner whatsoever. In fact, those of ordinary skill in the art may appreciate upon reading the present specification and viewing the present drawings that various modifications and variations can be made thereto.

An embodiment of the present invention includes a climate control apparatus, with reference to FIG. 1, comprising an exterior housing 100 having a plurality of walls, with an interior surface and an exterior surface.

Figure 2:
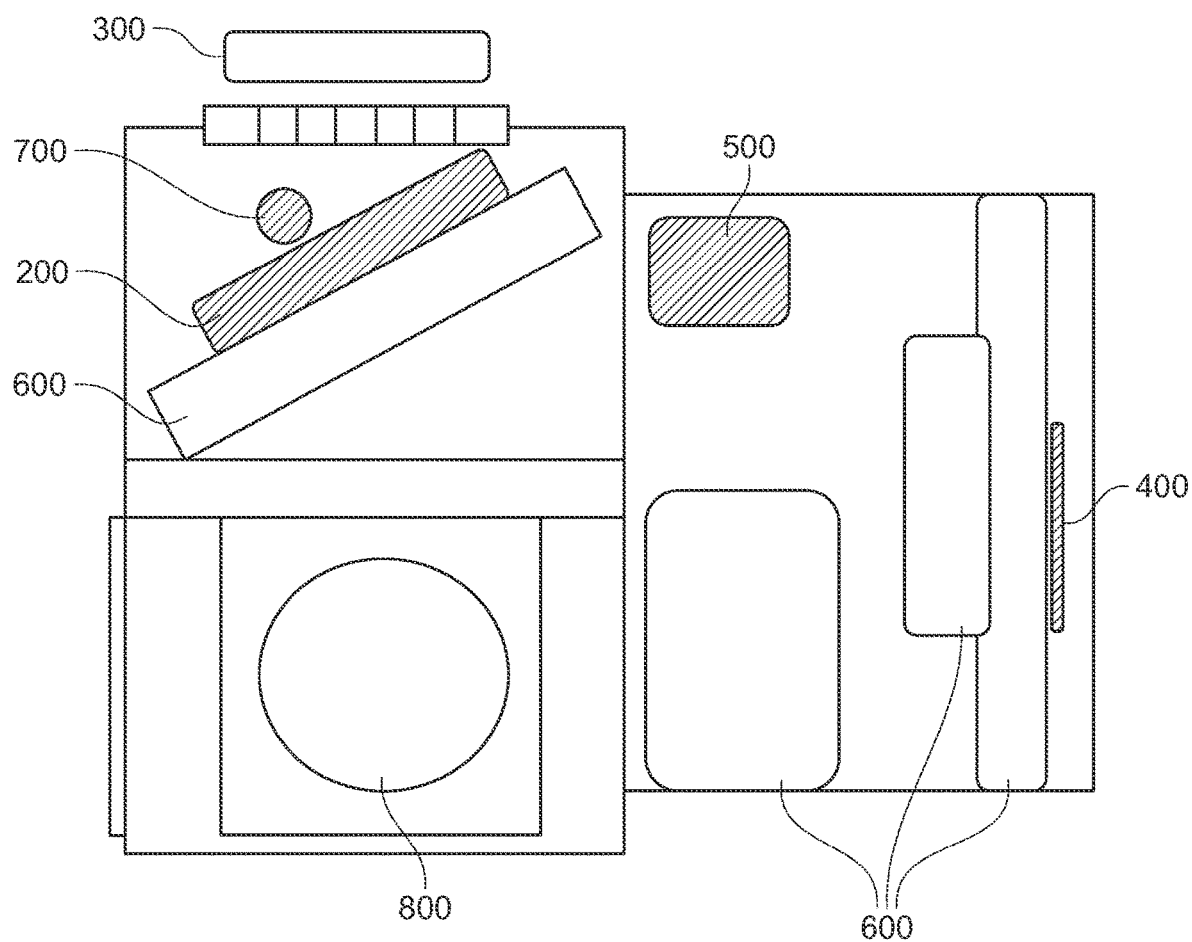
FIG. 2 is a side cross-sectional view, showing an example embodiment of the climate control apparatus according to the present disclosure.

In an embodiment, with reference to FIG. 2, the climate control apparatus of the present invention includes an electric heating coil 200 configured to generate heat using electricity. In an embodiment, the electric heating coil 200 is highly efficient relative to a steam heating coil. In some embodiments, the electric heating coil 200 is 1%, 2%, 3%, 4%, 5%, 6%, 7%, 8%, 9%, 10%, 11%, 12%, 13%, 14%, or 15% more efficient than an equivalent steam heating coil. In some embodiments, the electric heating coil 200 has a 30%-90% smaller carbon footprint than an equivalent steam heating coil. In some embodiments, the climate control apparatus of the present invention is 10-90% more efficient than the climate control apparatuses of the art, or consumes 10-90% less fossil fuels. In an embodiment, the electric heating coil 200 is at least partially made of carbon, a material comprising carbon, or a carbon-based material. In some embodiments, the electric heating coil is in the form of a fan heater, a convection heater, a surface heater, a cartridge heater, or an air heater. In some embodiments, any form of electric heater or heating element may be used as the electric heating coil of the present invention.

Preferably, the electric heating coil is a thermistor, more preferably a Positive Temperature Coefficient (PTC) heating coil or element, or a self-regulating heater. Such PTC heating elements or self-regulating heaters have a tendency to maintain a constant temperature due to the fact that these heaters/heating elements have a significant positive temperature coefficient of resistance. As a result, the resistance of the heater/heating element increases as the temperature of the heater/heating element increases, and conversely lowers as the temperature lowers. Such PTC heating elements or self-regulating heaters are significantly more efficient than ordinary resistive heaters/heating elements or coils. In an exemplary embodiment, the PTC heating element is a ceramic heating element or comprises a ceramic heating element, but in other embodiments, the PTC heating element may be made of polymers or other appropriate materials that provide the required material properties of a significant positive temperature coefficient of resistance.

In an embodiment, with reference to FIG. 2, the climate control apparatus of the present invention includes a steam heating coil 300 configured to generate heat using steam. In some embodiments, the steam heating coil 300 may also be configured to generate heat using hot water.

In an embodiment, with reference to FIG. 2, the climate control apparatus of the present invention includes a temperature sensor 400. In an embodiment, the temperature sensor 400 is attached to the exterior housing 100. In an embodiment, the temperature sensor 400 is configured to detect an ambient temperature of an outdoor space. In an embodiment, the temperature sensor 400 is configured to detect whether the ambient temperature of the outdoor space is above or below a threshold temperature.

In an embodiment, with reference to FIG. 2, the climate control apparatus of the present invention includes a controller 500. In some embodiments, the controller 500 is in electronic communication with at least the electric heating coil 200, the steam heating coil 300, and the temperature sensor 400. In an embodiment, the controller 500 is configured to control whether the electric heating coil 200 or the steam heating coil 300 are in an active or an inactive state. When the electric heating coil 200 or steam heating coil 300 are in their active states, they are actively using electricity or steam, respectively, to generate heat.

In an embodiment, the climate control apparatus of the present invention includes a heating switch having an active position and an inactive position. In an embodiment, the heating switch is in electronic communication with the controller 500, or is an integral part of the controller 500.

In an embodiment, the controller 500 causes the electric heating coil 200 to be in an active state when the heating switch is in the active position and when the temperature sensor 400 detects that the ambient temperature of the outdoor space is above a threshold temperature. In an embodiment, the controller 500 causes the electric heating coil 200 to be in an inactive state when the heating switch is in the active position and when the temperature sensor 400 detects that the ambient temperature of the outdoor space is below a threshold temperature. In an embodiment, the controller 500 causes the steam heating coil 300 to be in an active state when the heating switch is in the active position and when the temperature sensor 400 detects that the ambient temperature of the outdoor space is below a threshold temperature. In an embodiment, the controller 500 causes the steam heating coil 300 to be in an inactive state when the heating switch is in the active position and when the temperature sensor 400 detects that the ambient temperature of the outdoor space is above a threshold temperature. In some embodiments, the total heating capacity of the climate control apparatus is between 5,000 and 20,000 BTU/h, preferably between 7,000 and 16,000 BTU/h.

In some embodiments, the threshold temperature is between 25-40° F., preferably between 30-35° F., and more preferably is around 32° F. In an embodiment, the threshold temperature is manually adjustable. In an embodiment, the threshold temperature is automatically adjustable. In preferable embodiments, the threshold temperature is the temperature below which steam heating, hydronic heating, or hot water heating, using the steam heating coil, becomes more efficient or is more effective than electric heating, using the electric heating coil. The combination of a heating system with a plurality of distinct heading modes or methods with a controller configured to switch between heating modes based on which heating mode is most efficient or effective for the ambient conditions allows the present invention to be much more energy efficient than existing climate control solutions.

In an embodiment, with reference to FIG. 2, the climate control apparatus of the present application includes a cooling system 600. In an embodiment, the cooling system 600 includes one or more of an air filter, a supply fan, a condensate pan, an evaporator coil, a condenser coil, a condenser fan, and a compressor. In some embodiments, the cooling system 600 has a cooling capacity of between 5,000 and 20,000 BTU/h, preferably between 8,000 and 16,000 BTU/h.

In an embodiment, with reference to FIG. 2, the climate control apparatus of the present application includes a sterilization system 700. In some embodiments, the sterilization system 700 is configured to the interior of the climate control apparatus and/or the air passing through the climate control apparatus. In a preferable embodiment, the sterilization system 700 is an ultraviolet (UV) light-based sterilization system, more preferably a UV-C based sterilization system. In many embodiments, other sterilization systems or techniques may be used either instead, or in conjunction with UV or UV-C light, including, but not limited to, ionizing radiation, dry-heat sterilization, filtration, microwaves, infrared radiation, chemical-based sterilization, and others. In some embodiments, the sterilization system 700 is configured to kill and/or neutralize up to or greater than 99% of bacteria, germs, viruses, microorganisms, microbes, or any other undesirable and/or illness causing vectors.

In an embodiment, with reference to FIG. 2, the climate control apparatus of the present application includes a fan 800. In some embodiments, the fan is a plurality of fans. In some embodiments, at least one fan is an axial fan or a centrifugal fan. In some embodiments, the axial fan is one of a propeller fan, a tube axial fan, or a vane axial fan. In some embodiments, the centrifugal fan is one of a radial centrifugal fan, a forward-curved centrifugal fan, or a backward-curved centrifugal fan. In some embodiments, the fan is any fan appropriate for inclusion in a standard HVAC or PTAC system as would be appreciated by a person of ordinary skill in the art. In some embodiments, the fan creates an airflow of between 200 and 600 CFM, preferably between 250 and 500 CFM.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," and "third," are used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, a "first element," "component," "region," "layer" and/or "section" discussed below could be termed a second element, component, region, layer and/or section without departing from the teachings herein.

Features illustrated or described as part of one embodiment can be used with another embodiment and such variations come within the scope of the appended claims and their equivalents.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In conclusion, herein is presented a climate control apparatus. The disclosure is illustrated by example in the drawing figures, and throughout the written description. It should be understood that numerous variations are possible while adhering to the inventive concept. Such variations are contemplated as being a part of the present disclosure.

Example 1

A test building at 212 Warren Street in New York City was chosen for testing the climate control apparatus of the present disclosure. The test building had a total of 841 PTACs installed in the building. The test building was equipped with gas boilers to provide heat to the building through steam heating coils attached to the PTACs.

Beginning on Oct. 18, 2021, climate control apparatuses of the present disclosure were installed in the test building, replacing the existing PTACs. In total, as of Aug. 1, 2022, 150 of the original PTACs in the test building were replaced by climate control apparatuses of the present disclosure.

The test building has distinct winter and summer modes for the gas boilers. During the summer, the gas boilers do not produce steam, but merely heat the water in the system to provide a lower level of heat. However, during the winter, the gas boilers typically generated 7 lbs of steam pressure, in previous years, to be circulated around the test building to provide a greater amount of heat. As a result of the replacement of PTACs with the climate control apparatuses of the present disclosure, the test building was able to heat the building using only 1.8 lbs of steam during the winter, a significant reduction in the amount of steam required.

Data regarding gas and electricity consumption in the test building, both before and after the installation of the climate control apparatuses of the present disclosure, was collected and is displayed in Table 1, below.

TABLE 1

| Electric | | | | Gas | | |
|---|---|---|---|---|---|---|
| From Date | To Date | kWh | kW | From Date | To Date | Therms |
| Jun. 30, 2022 | Aug. 1, 2022 | 43,600 | 96.00 | Jun. 30, 2022 | Aug. 1, 2022 | 1,940 |
| Jun. 1, 2022 | Jun. 30, 2022 | 33,600 | 84.00 | Jun. 1, 2022 | Jun. 30, 2022 | 2,188 |
| May 2, 2022 | Jun. 1, 2022 | 30,000 | 76.00 | May 2, 2022 | Jun. 1, 2022 | 4,031 |
| Apr. 1, 2022 | May 2, 2022 | 27,600 | 60.00 | Apr. 1, 2022 | May 2, 2022 | 10,051 |
| Mar. 3, 2022 | Apr. 1, 2022 | 27,200 | 60.00 | Mar. 3, 2022 | Apr. 1, 2022 | 13,362 |
| Feb. 1, 2022 | Mar. 3, 2022 | 35,200 | 60.00 | Feb. 1, 2022 | Mar. 3, 2022 | 17,554 |
| Dec. 30, 2021 | Feb. 1, 2022 | 35,600 | 64.00 | Dec. 30, 2021 | Feb. 1, 2022 | 23,890 |
| | | | | | | 73,016 |
| Jun. 30, 2021 | Jul. 30, 2021 | 61,200 | 112.00 | Jun. 30, 2021 | Jul. 31, 2021 | 3,109 |
| Jun. 1, 2021 | Jun. 30, 2021 | 50,400 | 108.00 | Jun. 1, 2021 | Jun. 30, 2021 | 15,841 |
| Apr. 30, 2021 | Jun. 1, 2021 | 39,600 | 76.00 | Apr. 30, 2021 | Jun. 1, 2021 | 17,448 |
| Apr. 2, 2021 | Apr. 30, 2021 | 28,000 | 64.00 | Apr. 2, 2021 | Apr. 30, 2021 | 15,319 |
| Mar. 4, 2021 | Apr. 2, 2021 | 29,600 | 56.00 | Mar. 4, 2021 | Apr. 2, 2021 | 15,872 |
| Feb. 2, 2021 | Mar. 4, 2021 | 31,600 | 56.00 | Feb. 2, 2021 | Mar. 4, 2021 | 16,452 |
| Dec. 31, 2020 | Feb. 2, 2021 | 36,400 | 64.00 | Dec. 31, 2020 | Feb. 2, 2021 | 18,116 |
| | | | | | | 102,157 |

As can be seen in Table 1, above, the replacement of conventional PTACs with the climate control apparatuses of the present disclosure resulted in a significant reduction in gas consumption in the test building. Although only 150/841 PTACs were replaced (roughly 18% of the total number of PTACs), the test building saw an approximately 28.5% decrease in gas usage as compared to the equivalent period in the previous year. The climate control apparatuses of the present disclosure are thus able to realize enormous improvements in efficiency and reductions in use of fossil fuels.

Further, due to efficiency increases in the cooling systems and in the management of steam, and also due to the high efficiency of the heating element, the climate control apparatuses of the present disclosure did not cause the test building to consume more electricity during the time period in Table 1, above.

What is claimed is:

1. A climate control apparatus comprising:
an exterior housing having a plurality of walls, with an interior surface and an exterior surface;
an electric heating coil;
a steam heating coil;
a temperature sensor configured to detect an ambient temperature of an outdoor space;
a controller in electronic communication with the electric heating coil, the steam heating coil, and the temperature sensor; and
a heating switch in electronic communication with the controller and having an active position and an inactive position,
wherein when the temperature sensor detects that the ambient temperature of the outdoor space is above a threshold temperature, the controller is configured to a) activate the electric heating coil when the heating switch is in the active position, and b) activate the steam heating coil when the heating switch is in the active position and when the temperature sensor detects that the ambient temperature of the outdoor space is below a threshold temperature.

2. The climate control apparatus of claim 1, further comprising a cooling system.

3. The climate control apparatus of claim 2, wherein the cooling system comprises an air filter, a supply fan, a condensate pan, an evaporator coil, a condenser coil, a condenser fan, and a compressor.

4. The climate control apparatus of claim 1, wherein the threshold temperature is between 25-40° F.

5. The climate control apparatus of claim 4, wherein the threshold temperature is between 30-35° F.

6. The climate control apparatus of claim 5, wherein the threshold temperature is 32° F.

7. The climate control apparatus of claim 1, wherein the threshold temperature is adjustable.

8. The climate control apparatus of claim 7, wherein the threshold temperature is automatically adjustable or manually adjustable.

9. The climate control apparatus of claim 1, wherein the controller is configured to deactivate the electric heating coil when the temperature sensor detects that the ambient temperature of the outdoor space is below the threshold temperature or the heating switch is in the inactive position, and wherein the controller is configured to deactivate the steam heating coil when the temperature sensor detects that the ambient temperature of the outdoor space is above a threshold temperature or the heating switch is in the inactive position.

10. The climate control apparatus of claim 1, wherein the electric heating coil is at least partially made of carbon, a material comprising carbon, or a carbon-based material.

11. The climate control apparatus of claim 1, wherein the electric heating coil is at least partially made of ceramic, a material comprising ceramic, or a ceramic-based material.

12. The climate control apparatus of claim 1, wherein the electric heating coil is a positive temperature coefficient heating element.

13. The climate control apparatus of claim 1, further comprising a sterilization system.

14. The climate control apparatus of claim 12, wherein the sterilization system is a UV-C light-based sterilization system.

* * * * *